United States Patent
Tsurumi et al.

(10) Patent No.: US 8,379,370 B2
(45) Date of Patent: Feb. 19, 2013

(54) COMPOSITE MATERIAL, CAPACITOR USING THE SAME, AND THEIR PRODUCTION METHODS

(75) Inventors: Naoaki Tsurumi, Kyoto (JP); Yasuo Kanetake, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 561 days.

(21) Appl. No.: 12/530,273

(22) PCT Filed: Mar. 7, 2008

(86) PCT No.: PCT/JP2008/054161
§ 371 (c)(1),
(2), (4) Date: Sep. 8, 2009

(87) PCT Pub. No.: WO2008/108462
PCT Pub. Date: Sep. 12, 2008

(65) Prior Publication Data
US 2010/0103588 A1    Apr. 29, 2010

(30) Foreign Application Priority Data
Mar. 8, 2007    (JP) .................................. 2007-058322

(51) Int. Cl.
*H01G 9/04* (2006.01)
*H01G 9/145* (2006.01)
(52) U.S. Cl. ...................................... 361/528; 29/25.03
(58) Field of Classification Search .......... 361/528–529, 361/523–524; 29/25.03
See application file for complete search history.

(56) References Cited

U.S. PATENT DOCUMENTS

| 6,824,586 B2 | 11/2004 | Omori et al. |
| 6,939,775 B2 | 9/2005 | Bensaoula et al. |
| 7,110,244 B2 * | 9/2006 | Omori et al. .................. 361/524 |
| 7,126,813 B2 * | 10/2006 | Iida et al. ...................... 361/528 |
| 2006/0187618 A1 * | 8/2006 | IIda et al. ...................... 361/524 |
| 2007/0064375 A1 | 3/2007 | Urashima et al. |

FOREIGN PATENT DOCUMENTS

| JP | 6-96984 | 4/1994 |
| JP | 2001-358038 | 12/2001 |
| JP | 2002-173371 | 6/2002 |
| JP | 2007-96258 | 4/2007 |

OTHER PUBLICATIONS

Zhang et al., Robust, scalable self-aligned platinum silicide process, Apr. 7, 2006, Applied Physics Letters, 88, 142114 (2006), pp. 1-3.*

* cited by examiner

*Primary Examiner* — Eric Thomas
(74) *Attorney, Agent, or Firm* — Hamre, Schumann, Mueller & Larson, P.C.

(57) ABSTRACT

A composite material (A) includes a porous sintered body (12) and an insulation film (2) which covers the porous sintered body (12). The porous sintered body (12) is made of a combination of a metal element (12a) which has a melting temperature not lower than 1600° C., and a nonmetal element (12b, 12c). The insulation film (2) includes the nonmetal element (12b, 12c) and N.

11 Claims, 5 Drawing Sheets

COMPOSITE MATERIAL, CAPACITOR USING THE SAME, AND THEIR PRODUCTION METHODS

TECHNICAL FIELD

The present invention relates to a composite material which has a conductor covered by an insulation film, and to a capacitor which uses the composite material. The present invention also relates to a method of manufacturing the composite material and the capacitor.

BACKGROUND ART

FIG. 6, shows a conventional capacitor (see Patent Document 1, for example). The solid electrolytic capacitor X shown in the figure includes a porous sintered body 91 from which an anode wire 92 protrudes. The porous sintered body 91 is in the form of a rectangular parallelepiped. A dielectric layer 93 and a solid electrolyte layer 94 is laminated on the surface of the porous sintered body 91. The porous sintered body 91 is sealed with a resin package 98. An anode terminal 96A is electrically connected with the anode wire 92 via a conductive member 96C. The solid electrolyte layer 94 is bonded to a cathode terminal 96B with a conductive layer 95. The solid electrolytic capacitor X is surface-mountable on e.g. a circuit substrate using the anode terminal 96A and the cathode terminal 96B. The electrostatic capacity of the solid electrolytic capacitor X can be increased effectively by increasing the volume of the porous sintered body 91.

However, the higher the operating temperature becomes, the lower the reliability of the solid electrolytic capacitor X becomes. Thus, the capacitor is usable as an industrial part only in a temperature range with a typical upper limit temperature of about 125 through 150° C. In order to apply the solid electrolytic capacitor X to an automotive electric circuit component, and further to an energy storage device, for example, it is required to enhance the upper-limit operating temperature.

Patent Document 1: JP-A-2001-358038
Patent Document 2: U.S. Pat. No. 6,939,775

DISCLOSURE OF THE INVENTION

The present invention has been proposed under the above-described circumstances, and it is therefore an object of the present invention to provide a composite material capable of enhancing the upper-limit operating temperature, while also providing a capacitor using the composite material and their production method.

According to a first aspect of the present invention, there is provided a composite material including: a conductor made of a combination of a metal element having a melting temperature not lower than 1600° C. and at least one nonmetal element; and an insulation film covering the conductor and containing at least the nonmetal element and one of N and O.

With such an arrangement, the insulation film can be formed by heat treatment performed at a temperature of about 1200° C. for example, which causes the nonmetal element to separate out on a surface of the conductor, and this nonmetal element to combine with N or O. The resulting insulation film is stable without being destroyed when it is kept at a temperature of about 300° C., for example.

Preferably, the metal element is selected from Mo, Nb, Os, Ta, Ti, W, Zr, Hf, Ir, Cr, Th, V, Lu, Pt, Re, Ru and Rh. Such an arrangement is suitable for performing the step of forming the insulation film at a high temperature, for example, about 1200° C.

Preferably, the nonmetal element is selected from C, B and Si. With such an arrangement, the conductor which contains the metal element and the nonmetal element can be made as a good electrical conductor having a remarkably low resistance. Further, since these elements become activated at about 1200° C., the step of forming the insulation film can be performed at a temperature of about 1200° C. This is advantageous to stabilizing the insulation film in a relatively high-temperature environment.

Preferably, the conductor contains at least two nonmetal elements selected from C, B and Si. The insulation film contains the same two or more nonmetal elements as those contained in the conductor. With such an arrangement, the insulation film can be made thin and fine, and also stable at a higher temperature.

According to a second aspect of the present invention, there is provided a capacitor which uses the composite material provided by the first aspect of the present invention. The capacitor includes: a first electrode which contains the conductor; and a second electrode which is insulated from the first electrode via the intervening insulation film.

With such an arrangement, the capacity or the withstand-voltage of the capacitor is prevented from decreasing, and thus the capacitor can be used stably even in high temperature environments of about 300° C. which is remarkably higher than the upper-limit operating temperature of the conventional capacitor. Therefore, the capacitor can be used as a component part for electric circuit of an automotive or industrial device, or an energy storage device.

Preferably, the conductor is a porous sintered body, the insulation film covers a surface of the conductor provided by the porous sintered body, and the second electrode covers the insulation film. With such an arrangement, the surface area of the first electrode can be made large, which is suitable for increasing the capacity of the capacitor.

According a third aspect of the present invention, there is provided a manufacturing method of a composite material, including the steps of: preparing a conductor made of an combination of a metal element having a melting temperature not lower than 1600° C. and at least one nonmetal element; and forming an insulation film covering the conductor by subjecting the conductor to heat treatment in an atmosphere containing at least one of N and O, where the heat treatment is performed at a temperature causing the nonmetal element to separate out on a surface of the conductor.

With such an arrangement, the insulation film can be relatively stable at temperatures lower than the element separation temperature. Specifically, if the separation process is performed at about 1200° C. which is lower than the melting temperature of the metal element i.e. 1600° C., it is possible to form the insulation film which is stable in a temperature environment of at least at about 300° C.

Preferably, the metal element is selected from Mo, Nb, Os, Ta, Ti, W, Zr, Hf, Ir, Cr, Th, V, Lu, Pt, Re, Ru and Rh.

Preferably, the nonmetal element is selected from C, B and Si. Such an arrangement is suitable for making the conductor as a good electrical conductor, and for causing the nonmetal element to separate out on the surface of the conductor at a temperature lower than 1600° C.

Preferably, the conductor includes at least two nonmetal elements selected from C, B and Si. With such an arrangement, the insulation film can be formed as a thin and fine film. It is also suitable to make the insulation film stable in a high-temperature environment.

According to a fourth aspect of the present invention, there is provided a manufacturing method of the capacitor according to the second aspect of the present invention. The method includes the steps of: forming a porous sintered body made of the conductor by sintering fine powder of the conductor; forming an insulation film covering the porous sintered body by heating the porous sintered body at a temperature which is lower than a temperature of the sintering and which causes the nonmetal element to separate out on a surface of the conductor in an atmosphere containing at least one of N and O, where the insulation film is formed by reaction between the separated nonmetal element and at least one of N and O on a surface of the conductor; and forming the second electrode by covering the insulation film with a conductive material. With such an arrangement, it is possible to appropriately manufacture a capacitor usable in environments of a temperature of e.g. about 300° C. i.e. a temperature remarkably higher than the upper-limit operating temperature of the conventional capacitor.

Other characteristics and advantages of the present invention will become clearer from the detailed description to be made hereinafter with reference to the attached drawings.

BEST MODE FOR CARRYING OUT THE INVENTION

Figure 1:
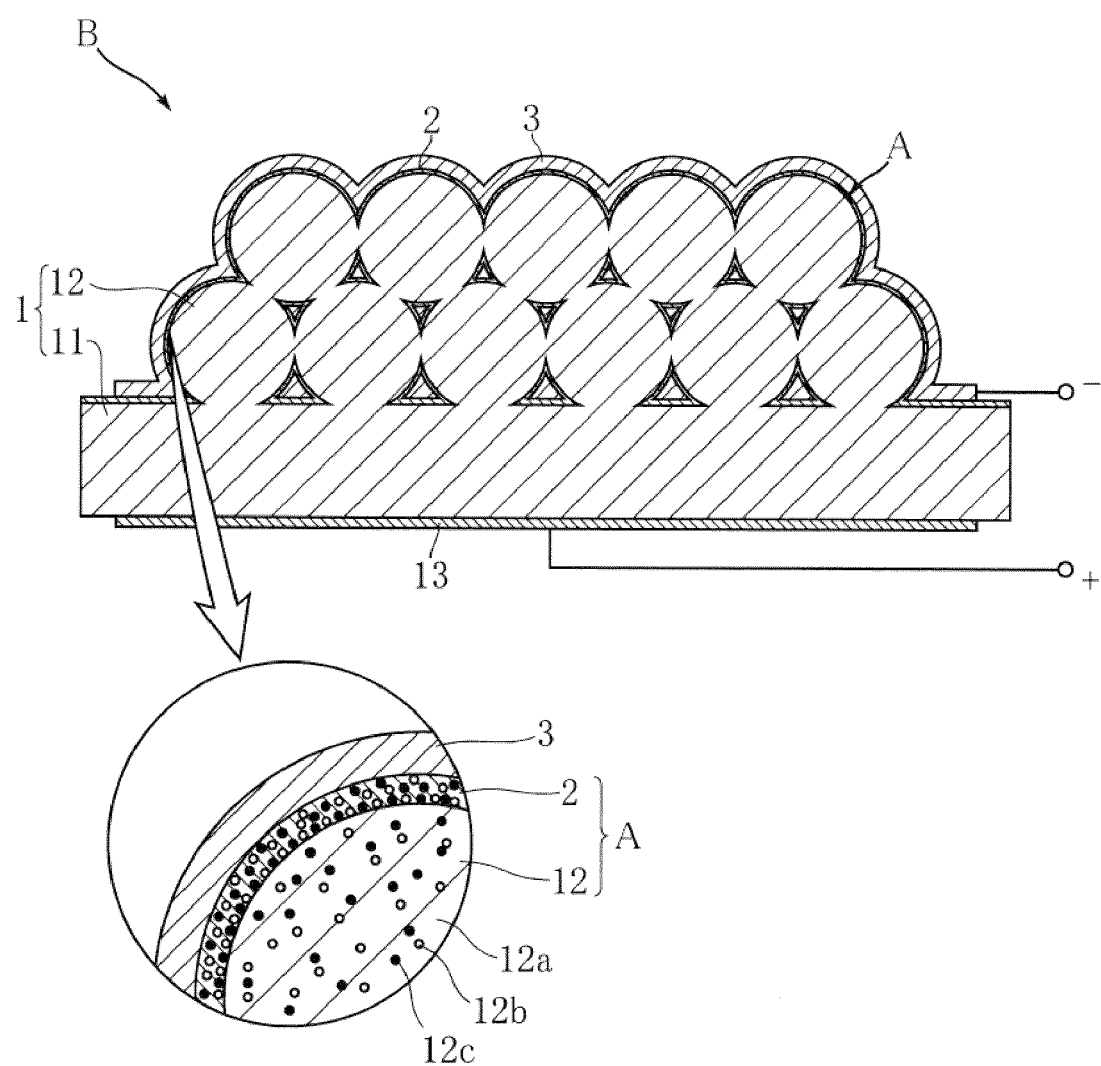
FIG. 1 is a sectional view showing a composite material and a capacitor according to the present invention.

FIG. 1 shows a capacitor according to the present invention. The capacitor B according to the present embodiment includes a first electrode 1, an insulation film 2, and a second electrode 3, and is configured as a nonpolar capacitor. Although the first electrode 1 is connected to the positive terminal of whereas the second electrode 3 is connected to the negative terminal of the power source in the figure, the power source may be connected in the reverse polarity. The capacitor B includes a composite material A.

The first electrode 1 is a companion of the pair of electrodes provided in the capacitor B, and is made of a metal plate 11, a porous sintered body 12, and a metal layer 13. The metal plate 11 is made of TaB, for example. The metal layer 13 is formed on a back surface of the metal plate 11. The metal layer 13 is made of e.g. Au, Cu, Ni, Al or an alloy of them, and is used for connection with the power source.

The porous sintered body 12 contains a metal element 12a and two kinds of nonmetal elements 12b, 12c. The metal element 12a is provided by an element having a melting temperature not lower than 1,600° C., and specifically, selected from Mo, Nb, Os, Ta, Ti, W, Zr, Hf, Ir, Cr, Th, V, Lu, Pt, Re, Ru and Rh. In the present embodiment, Ta is used. The nonmetal elements 12b, 12c are provided by an element constituting a good electric conductor by being combined with the metal element 12a. Specifically, they are selected from C, B, and Si. In the present embodiment, B is selected for the nonmetal element 12b whereas Si is selected for the nonmetal element 12c. The porous sintered body 12 is a form of the conductor according to the present invention, and is made by sintering a fine power of a chemical compound of the metal element 12a and the nonmetal elements 12b, 12c. The porous sintered body 12 as described above has a large number of fine pores.

The insulation film 2 is a thin film covering part of the metal plate 11 and the porous sintered body 12. The insulation film 2 is made of an insulating material containing the same nonmetal elements 12b, 12c as contained in the porous sintered body 12 and at least one of N and O. In the present embodiment, the insulation film 2 contains N. Differently from the present embodiment, the insulation film 2 may contain O, or both of N and O.

The second electrode 3 is the other companion of the pair of electrodes provided in the capacitor B, and is made of Ni, for example. The second electrode 3 covers the insulation film 2. In the present embodiment, the second electrode 3 is formed to fill the fine pores in the porous sintered body 12.

The capacitor B according to the present embodiment provides an electrostatic capacity of about 3 µF if the porous sintered body 12 has a volume of 0.25 cc.

Next, a manufacturing method of the composite material A and the capacitor B will be described below with reference to FIG. 2 through FIG. 5.

Figure 2:
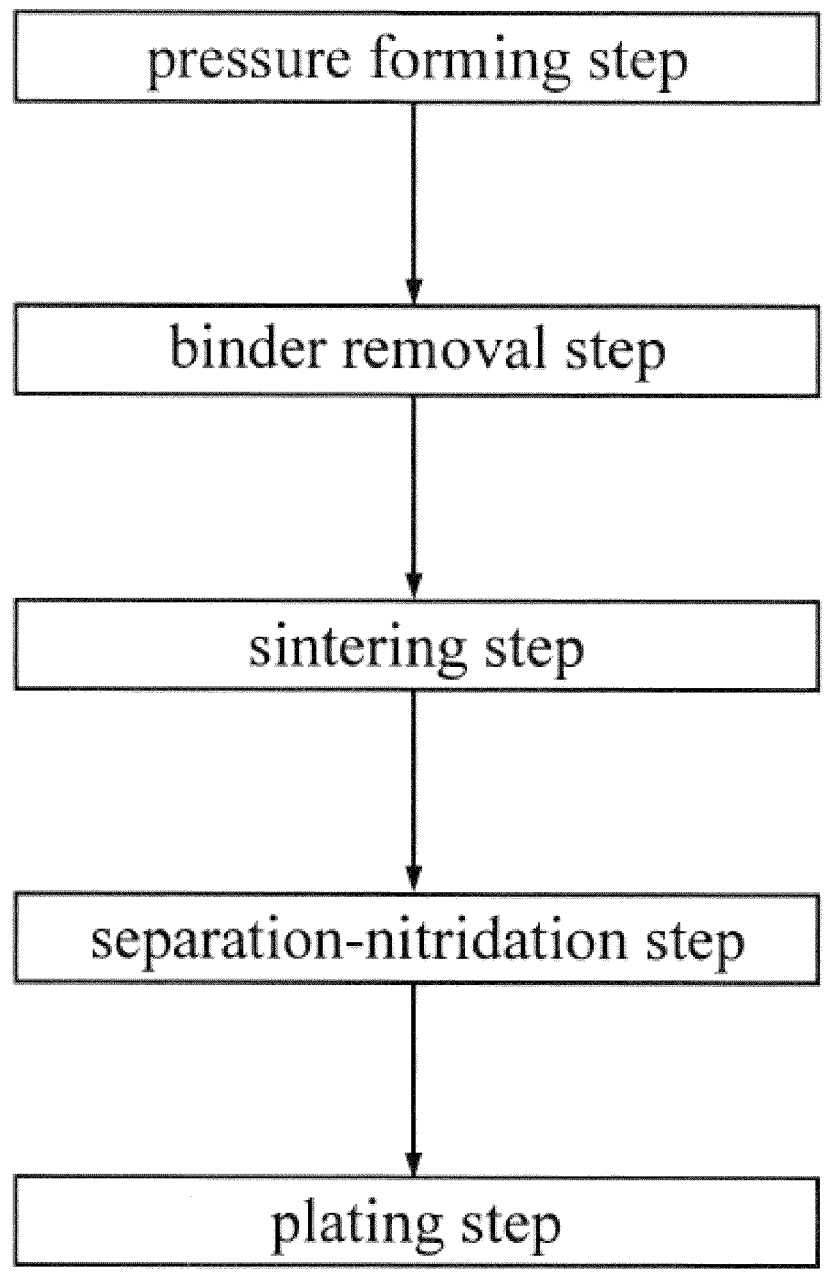
FIG. 2 is a flowchart showing a manufacturing method of a composite material and a capacitor according to the present invention.

FIG. 2 shows a flow of the manufacturing method of the composite material A and the capacitor B. The manufacturing method of the composite material A and the capacitor B includes a pressure forming step, a binder removal step, a sintering step, a separation-nitridation step and a plating step.

Figure 3:
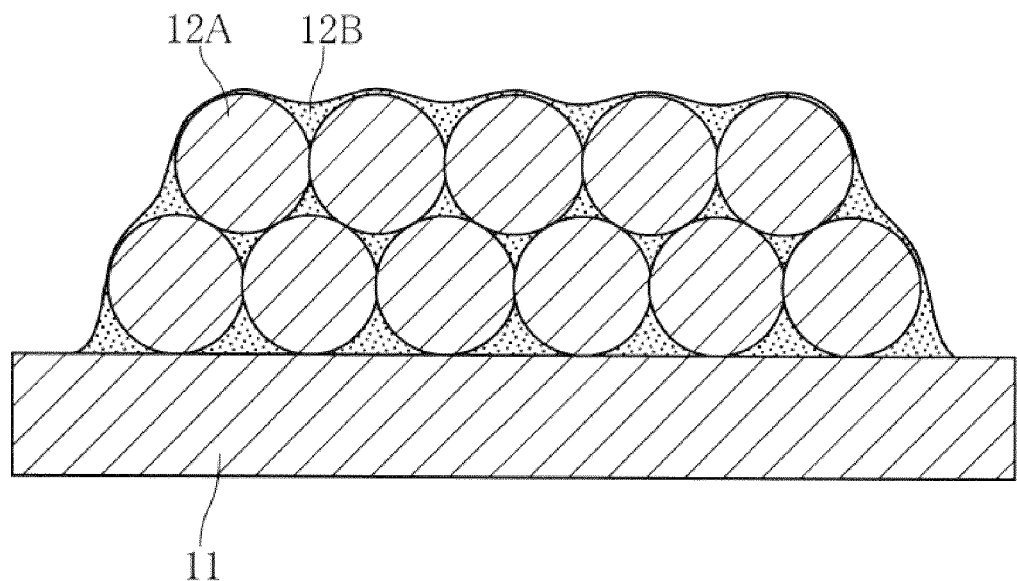
FIG. 3 is a sectional view showing a pressure forming step of the manufacturing method.
Figure 4:
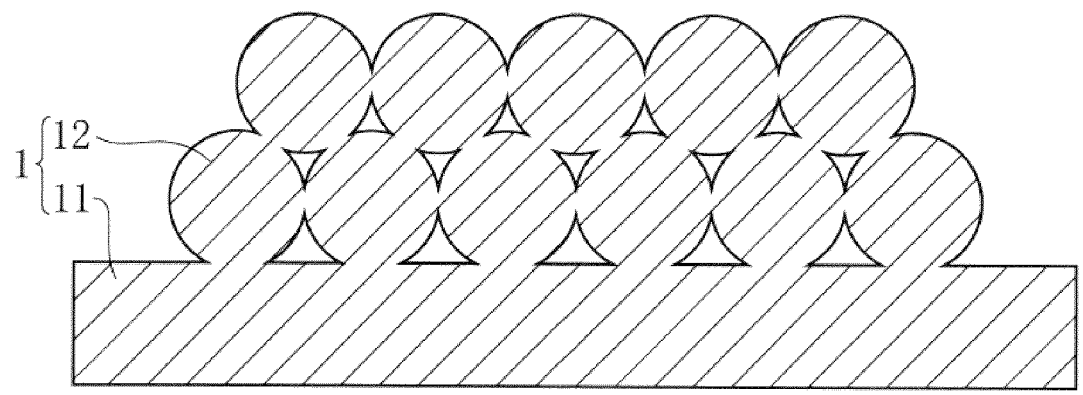
FIG. 4 is a sectional view showing a sintering step of the manufacturing method.

FIG. 3 shows the pressure forming step. Firstly, a metal plate 11 made of TaB is prepared. Further, a fine powder 12A is prepared by mixing e.g. a fine powder of TaB and a fine powder of TaSi. The particle diameter of the fine power 12A is about 50 µm, for example. The fine power 12A is mixed with a binder 12B to obtain a paste which contains the fine power 12A. Subsequently, the paste is put into an appropriate metal mold, and then the paste and the metal plate 11 are pressurized by a hydraulic press machine, for example. In this process the fine power 12A sticks to the metal plate 11. In this state, the fine power 12A has a porous structure with the binder 12B contained therein.

Subsequently, the binder removal step is performed. In this step, the metal plate 11 and the paste which have undergone the pressure forming step are heated in an Ar gas atmosphere at a temperature not higher than 500° C. Thus, the binder is removed.

Subsequently, the sintering step is performed. In this step, the metal plate 11 and the fine powder 12A are subjected to a heat treatment in a vacuum condition. The heat treating temperature in this step is set to approximately 1300 through 1400° C. The heat treating temperature as described promotes neck growth of Ta contained in the fine powder 12A. Thus, diffusion is performed at the portion in which particles of the fine powder 12A are in contact with each other, or at the portion in which a particle of the fine powder 12A and the metal plate 11. By such a sintering process, the first electrode 1 shown in FIG. 4 and constituted by the metal plate 11 and the porous sintered body 12 is obtained.

Figure 5:
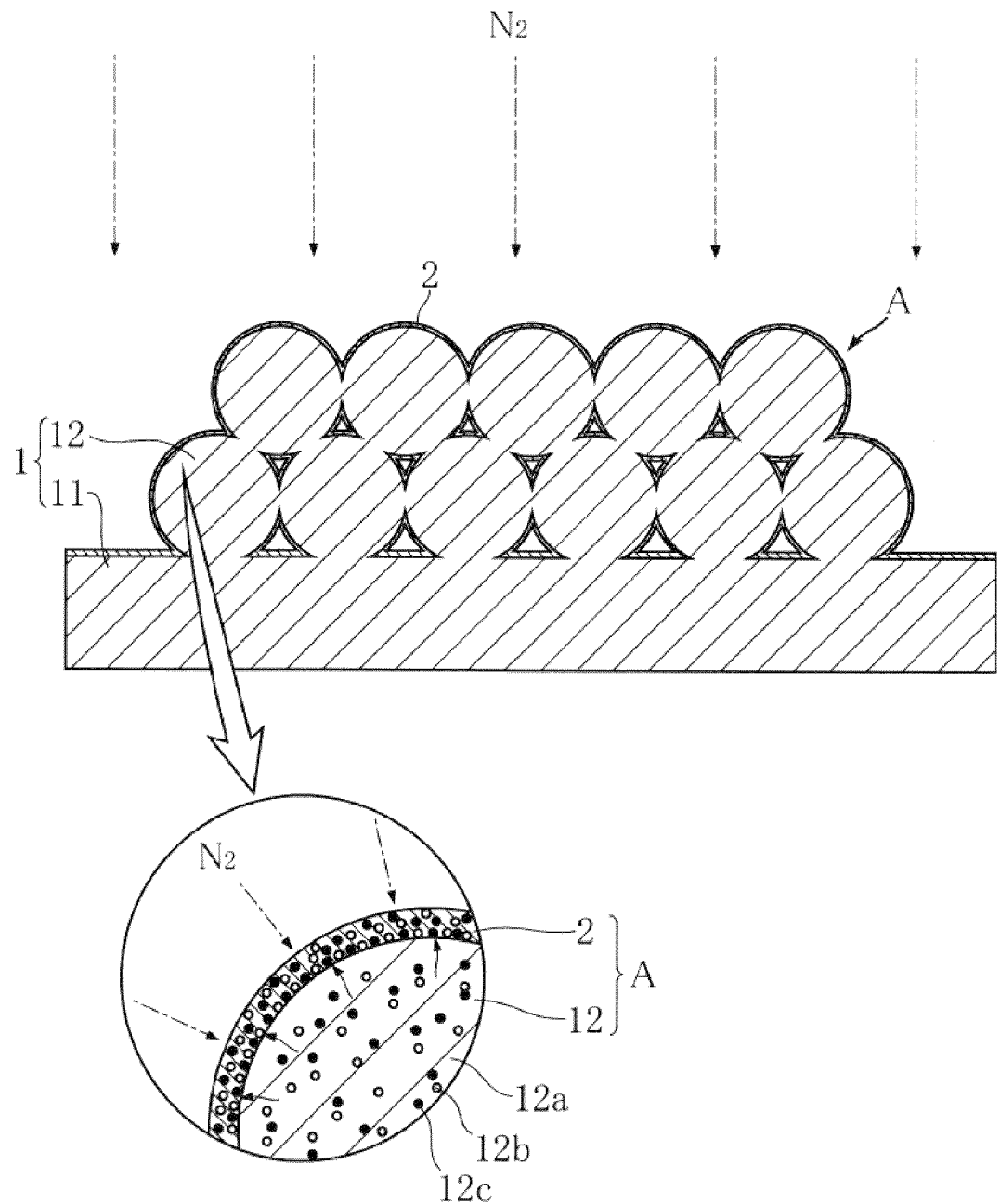
FIG. 5 is a sectional view showing a separation-nitridation step of the manufacturing method.
Figure 6:
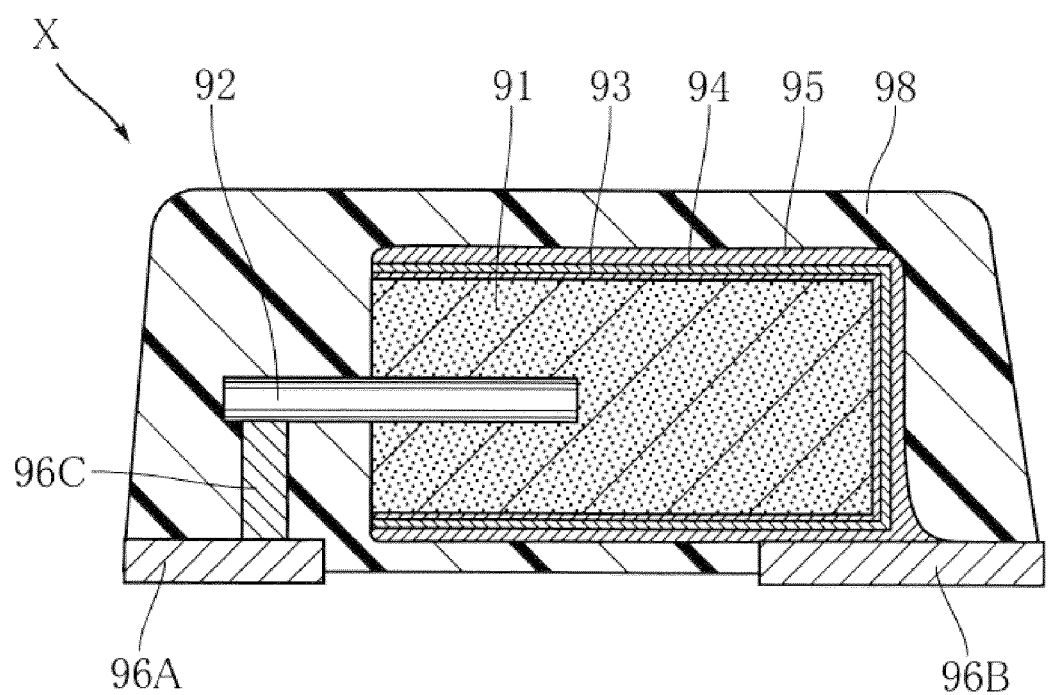
FIG. 6 is a sectional view showing a conventional capacitor.

Subsequently, as shown in FIG. 5, the separation-nitridation step is performed. In this step, the first electrode 1 is subjected to a heat treatment in an N-containing atmosphere such as $N_2$ gas or $NH_3$ gas, for example. The heat treating temperature at this step is about 1200° C., for example. This heat treating temperature remarkably facilitates the activation of the nonmetal elements 12b, 12c provided by B, Si, but does not cause any significant progress in the neck growth of Ta. Thus, the nonmetal elements 12b, 12c will separate out on the surfaces of the metal plate 11 and the porous sintered body 12. Then, on the surfaces of the metal plate 11 and the porous sintered body 12, an insulation film 2 is formed, which contains the nonmetal elements 12b, 12c, which are B and Si, and N from the ambient atmosphere. The insulation film 2 cannot be identified as a pure chemical compound such as one expressed as BN, for example, but is identified as a film made of an insulating substance containing at least B, Si and N, and possibly Ta. After the separation-nitridation step, the composite material A is obtained.

Subsequently, the plating step is performed. The plating step is a well-known step for forming the second electrode 3 in FIG. 1. In the plating step, the second electrode 3 made of Ni is formed by e.g. electroless plating. By electroless plating, the second electrode 3 can be formed so as to fill fine pores in the porous sintered body 12. Then, a metal layer 13 is formed on the back surface of the metal plate 11, whereby the capacitor B shown in FIG. 1 is obtained. Although such a process is not shown in the flowchart of FIG. 2, the porous sintered body 12, the insulation film 2 and the second electrode 3 may be covered by a resin package.

Next, the advantages of the composite material A, the capacitor B and the manufacturing method thereof will be described.

According to the present embodiment, the insulation film 2 exists stable without being undesirably destroyed even if it is placed in an environment of a temperature at about 300° C. A conceivable reason is that the film is formed in the separation-nitridation step which includes a heat treatment process performed at about 1200° C. Specifically, the insulation film 2 is made of an insulating material produced by bonding the nonmetal elements 12b, 12c provided by B and Si and N in a complicated and versatile form in an extremely high temperature condition. This insulating material is not destroyed under the environment of about 300° C. which is remarkably lower than the above-described heat treatment temperature. Therefore, the composite material A and the capacitor B made thereof do not show remarkable decrease in its capacity or withstand voltage and can be used stably in high temperature environments of about 300° C., which is remarkably higher than the upper-limit operating temperature of the conventional capacitor. Such a capacitor B is suitable for use as a constituent part for electric circuit of an automotive or industrial instrument or as an energy storage device. In the formation process of the insulation film 2, O (oxygen) may be used in place of N. In this case, the insulation film 2 can be formed by performing a separation-oxidization step in an Ar gas atmosphere containing a very small amount of oxygen in the order of ppm, for example, instead of the separation-nitridation step described above. Alternatively, the insulation film 2 containing N and O can be formed by performing a separation-oxidization-nitridation step in an $N_2$ gas atmosphere which containing a very small amount of oxygen.

The element Ta which constitutes the metal element 12a has a high melting-point of not lower than 1600° C. Therefore, it is possible to sinter the material at a relatively high temperature of about 1300 through 1400° C. This is advantageous to relative enhancement of the heat treatment temperature in the separation-nitridation step, which should be lower than the sintering temperature. Examples of the metal element 12a other than Ta which offers the same advantage include Mo, Nb, Os, Ti, W, Zr, Hf, Ir, Cr, Th, V, Lu, Pt, Re, Ru, and Rh.

B and Si used as the nonmetal elements 12b, 12c are elements which easily penetrates into the metal element 12a selected from the elements listed above. the compound of B, Si and Ta is a remarkably good electrical conductor material. It is suitable for decreasing the resistance of the capacitor B. Further, B and Si become activated at a lower temperature than the temperature at which the metal element 12a is sintered. Thus, after the sintering step, the separation-oxidization step can be performed at a lower heat treatment temperature. This is suitable for forming a fine insulation film 2 on the surface of the conductor mentioned in the present invention, one form of which is a porous sintered body 12. Further, use of B and Si is advantageous to formation of an insulation film 2 which can withstand high temperatures using the above-described separation-nitridation step. In particular, use of two kinds of nonmetal elements 12b, 12c is suitable to formation of a thin and fine insulation film 2 and to making an insulation film 2 which is stable at temperatures about 300° C. As a result, it is possible to reliably increase the upper-limit operating temperature of the capacitor B. Examples of the nonmetal elements 12b, 12c which causes such an advantage other than B, Si include C. Differently from the present embodiment, only one nonmetal element 12b may be selected from B, Si and C. The combination which includes nonmetal elements is not limited to the one described in the above embodiment. For example, a combination of Ta, C and B may be formed by sputtering of Boron (B) a metal plate of a metal element Ta containing a nonmetal element C. A capacitor can be produced from this combination by the separation-nitridation step and the plating step, for example.

The composite material, the capacitor and their manufacturing method according to the present invention are not limited to the embodiments described above. Specific arrangements for the capacitor and the manufacturing method thereof may be varied in many ways.

The porous sintered body 12 described above is one form of the conductor mentioned in the present invention. The form of the conductor according to the present invention is not limited to this. For example, the conductor may be formed into a thin platy shape or a rod-like shape.

The invention claimed is:

1. A capacitor comprising:
   a first electrode including a conductor made of a metal element and a nonmetal element;
   an insulation film covering the conductor and containing the nonmetal element and one of N and O; and
   a second electrode insulated from the first electrode via the insulation film,
   wherein the metal element is selected from Mo, Nb, Os, Ta, Ti, W, Zr, Hf, Ir, Cr, Th, V, Lu, Pt, Re, Ru and Rh, and the nonmetal element is selected from C, B and Si,
   wherein the insulation film is greater in concentration of the nonmetal element than the conductor.

2. The capacitor according to claim 1, wherein the conductor contains at least two nonmetal elements selected from C, B and Si, and the insulation film contains said at least two nonmetal elements.

3. The capacitor according to claim 1, wherein the metal element is Ta, and the nonmetal element is B and Si.

4. The capacitor according to claim 1, wherein the second electrode is made of Ni.

5. A manufacturing method of a composite material, the method comprising the steps of:
   preparing a conductor by sintering a fine powder that includes a metal element having a melting temperature not lower than 1600° C. and a nonmetal element, and the conductor being produced as a combination including the metal element and the nonmetal element; and forming an insulation film covering the conductor by subjecting the conductor to heat treatment in an atmosphere containing at least one of N and O, the heat treatment being performed at a temperature causing the nonmetal element to separate out on a surface of the conductor, wherein the nonmetal element is at least one selected from C, B and Si, and said at least one nonmetal element is distributed in the entirety of the conductor.

6. The manufacturing method of a composite material according to claim 5, wherein the metal element is selected from Mo, Nb, Os, Ta, Ti, W, Zr, Hf, Ir, Cr, Th, V, Lu, Pt, Re, Ru and Rh.

7. The manufacturing method of a composite material according to claim 5, wherein the conductor includes at least two nonmetal elements selected from C, B and Si, said at least two nonmetal elements being distributed in the entirety of the conductor.

8. A manufacturing method of a capacitor, a composite material being used in the capacitor, the composite material comprising: a conductor made of a combination of a metal element having a melting temperature not lower than 1600° C. and at least one nonmetal element; and an insulation film covering the conductor and containing at least the nonmetal element and one of N and O, the capacitor comprising: a first electrode including the conductor; and a second electrode insulated from the first electrode via the insulation film, the method comprising the steps of:

forming a porous sintered body made of the conductor by sintering fine powder of the conductor;

forming an insulation film covering the porous sintered body by heating the porous sintered body at a temperature which is lower than a temperature of the sintering and which causes the nonmetal element to separate out on a surface of the conductor in an atmosphere containing at least one of N and O, the insulation film being formed by reaction between the separated nonmetal element and at least one of N and O on a surface of the conductor; and forming the second electrode by covering the insulation film with a conductive material.

9. The manufacturing method according to claim 8, wherein the metal element is selected from Mo, Nb, Os, Ta, Ti, W, Zr, Hf, Ir, Cr, Th, V, Lu, Pt, Re, Ru and Rh.

10. The manufacturing method according to claim 8, wherein the nonmetal element is selected from C, B and Si.

11. The manufacturing method according to claim 10, wherein the conductor contains at least two nonmetal elements selected from C, B and Si, and the insulation film contains said at least two nonmetal elements.

* * * * *